United States Patent [19]

Woltmann

[11] Patent Number: 4,894,151
[45] Date of Patent: Jan. 16, 1990

[54] FILTER CARTRIDGE FOR AN UNDERGRAVEL AQUARIUM FILTER

[75] Inventor: Klaus Woltmann, Demarest, N.J.

[73] Assignee: Willinger Brothers, Inc., Oakland, N.J.

[21] Appl. No.: 256,904

[22] Filed: Oct. 12, 1988

[51] Int. Cl.$^4$ ............................................. A01K 63/04
[52] U.S. Cl. .................................. 210/169; 210/416.2; 210/282; 210/449; 119/5
[58] Field of Search ...................... 210/169, 416.2, 282, 210/449; 119/3, 5

[56] References Cited

U.S. PATENT DOCUMENTS

| | | | |
|---|---|---|---|
| 423,767 | 3/1890 | Hough | 210/282 |
| 470,192 | 3/1892 | Gross | 210/499 |
| 1,276,271 | 8/1918 | Rossignol | 210/282 |
| 1,638,066 | 8/1927 | Smythe | 210/438 |
| 2,935,199 | 5/1960 | Willinger | 210/169 |
| 3,146,195 | 8/1964 | Berardi | 119/5 |
| 3,151,069 | 5/1961 | Halpert | 210/169 |
| 3,199,678 | 8/1965 | Willinger | 210/169 |
| 3,891,555 | 6/1975 | Bennett et al. | 210/169 |
| 3,994,811 | 11/1976 | Cohen et al. | 210/169 |
| 4,385,989 | 5/1983 | Margolis | 210/169 |
| 4,683,057 | 7/1987 | Krause et al. | 210/232 |
| 4,802,980 | 2/1989 | Gilkey et al. | 210/169 |

Primary Examiner—Richard V. Fisher
Assistant Examiner—Coreen Y. Lee
Attorney, Agent, or Firm—Helfgott & Karas

[57] ABSTRACT

An undergravel filter of an aquarium tank served by a power head to suck water from a chamber located beneath the undergravel filter to circulate this water into the tank. A riser tube connects the filter with the power head and contains a carbon cartridge, fixed to the power head. The carbon cartridge is perforated and has a substantially conical configuration. The cartridge is filled with carbon which provides chemical filtration of the water before it is returned into the aquarium tank.

14 Claims, 2 Drawing Sheets

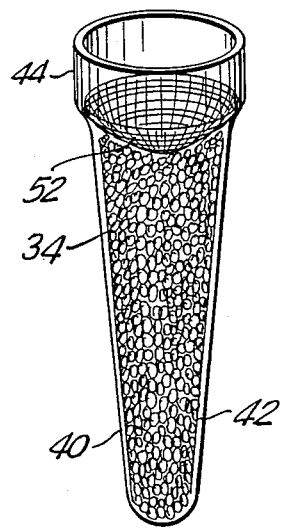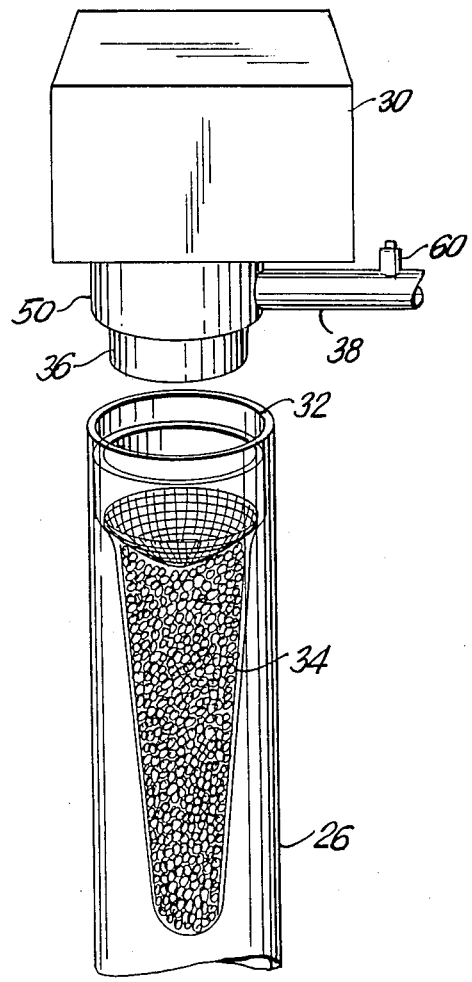
FIG.2
FIG.3

FILTER CARTRIDGE FOR AN UNDERGRAVEL AQUARIUM FILTER

BACKGROUND OF THE INVENTION

The present invention relates in general to aquarium filtering devices which are typically disposed beneath the surface of the aquarium bed and more particularly to a filter cartridge which filters water which is sucked by a water pump from the space beneath the aquarium filter device and returned to the water contained in the aquarium.

Undergravel aquarium filters generally include a perforated plate or panel previous to water and supporting thereon a gravel bed and which is, in turn, supported in the aquarium tank in spaced relation with the bottom wall or floor of the aquarium. This plate defines with the aquarium bottom wall a chamber which receives water flowing through the gravel bed on the undergravel filter. The water collected in the chamber between the perforated panel and the bottom wall of the aquarium is drawn from that chamber, aerated and returned to the aquarium tank. In this manner the aquarium water is continually drawn through the gravel bed which filters the water and to some degree conditions the same due to the fact that bacteria settled on the gravel particles provide aerobic filtration of water. Thus, the typical underground filter provides for two of the three main methods of filtration, namely mechanical and biological filtration. It does not provide for chemical filtration.

The water flowing through the gravel bed and into the chamber between the perforated plate and the aquarium tank floor, must be circulated back into the aquarium tank. In one conventional method, a riser tube is connected leading from the chamber below the perforated plate which leads back to the water within the aquarium tank above the plate. An air pump is employed, which pumps air into the chamber below the riser tube. The air flows upwardly in the riser tube and generates a reduced pressure thereby causing the water to flow upwardly in the riser tube from the chamber and back into the aquarium tank above the plate. In addition, air bubbles produced by the air pump aerate the water which is returned into the tank. In this method both air and water flow up the riser tube and any restriction can cut down the flow of water in the riser tube.

In other conventional methods, so-called power heads are utilized for the water withdrawal from the chamber beneath the perforated plate. The power head is a water pump electrically driven for sucking water collected in the chamber formed between the plate and the bottom of the aquarium tank and causing it to flow upward in the riser tube and into the aquarium tank above the plate. One or more nozzles are mounted on the power head which faces the interior of the aquarium tank, to direct the water back into the tank.

U.S. Pat. No. 2,935,199 discloses a typical undergravel filtering device which comprises a flat perforated supporting plate spaced from the bottom of the aquarium tank and permitting water to pass therethrough but preventing the gravel from passing through its openings. An air tube is connected to an air pump to draw the water by generating air bubbles into the chamber. The water from the chamber between the supporting plate and the bottom wall of the aquarium tank flows up a riser tube which extends to the level of the water in the aquarium tank and conveys the water and air from that chamber back into the tank.

U.S. Pat. No. 3,199,678 shows a water treatment assembly for an undergravel filtering device, which comprises an air inlet tube and a riser tube retained in position by a collar and attached to a flat base mounted on the undergravel filtering device. When the water treatment assembly is in operation the air bubbles which enter the chamber beneath the undergravel filter through the air inlet tube will push or move the water upwardly into the riser tube. The water treatment assembly is situated in the riser tube and provides chemical filtration as the water passes through it. However, since both air and water flow up the riser tube, there is only a limited amount of chemical filtration that can be achieved since chemical filtration is dependent upon the amount of water turnover flowing through the chemical filter. Additionally, in the configuration shown, any small restriction in the riser tube cuts down the flow by as much as 75%. Thus even the chemical filter itself positioned in the riser tube acts to cut down the flow of water.

With all conventional undergravel filtering devices, however, small particles remain entrapped in the water after the latter has passed the gravel bed. Also, when using the power head for sucking the water up the riser tube there is a need for additional degassing and filtering of the water before it is returned to the aquarium tank. The filtration of the underground filter cannot provide for the chemical filtration thus, there is no way to remove the chlorine in a fish tank. Likewise, food dyes in the fish food cannot be removed. Urea and other by-products remain in the aquarium water and cause a yellowing of the aquarium water. Should medications be added for the elimination or prevention of fish diseases, these also remain in the water without being filtered.

Accordingly there is need for a reliable filtering device for chemical filtration of the aquarium water when using an underground filter. This is especially important when a power head is used whereby there is a great flow of water up the riser tube, which flow should not be restricted by the chemical filter.

SUMMARY OF THE INVENTION

It is thus an object of the present invention to provide a further filtering device for chemical filtration of water removed from the undergravel filter by a power head.

It is another object of the present invention to provide a disposable cartridge easily insertable into and removable from a riser tube, which cartridge can be easily snapped on the power head and which does not restrict the flow of water up the riser tube.

Briefly, in accordance with the invention, there is provided a filter cartridge attached to a power head and inserted in a riser tube provided in an aquarium tank to convey water sucked by the power head from an undergravel filter chamber, back to the aquarium tank.

In an embodiment, the filter cartridge is an elongated substantially conical container which is perforated and filled with, for example, carbon, to purify the water entering the power head and returned to the aquarium tank. The conical perforated peripheral wall of the container provides a large filtering surface for the water passing therethrough and prevents restriction of the flow of water up the riser tube.

In an embodiment, any suitable water treatment material may be added in the container beside the carbon inserted in the cartridge, to thereby filter and condition the water returned to the aquarium tank.

In an embodiment, a perforated plug of a substantially conical configuration is inserted in the cartridge to further increase the filtering surface of the filter cartridge.

In an embodiment, the cartridge has a substantially cylindrical upper portion dimensioned so as to friction fit on a bottom extension of the power head.

In an embodiment, the filling material of the cartridge is carbon.

The cartridge can be easily removed from the riser tube for replacement or re-filling with filtering material.

The aforementioned objects, features and advantages of the invention will, in part, become obvious from the following more detailed description of the invention, taken in conjunction with the accompanying drawing, which form an integral part thereof.

BRIEF DESCRIPTION OF THE DRAWINGS

FIG. 2 is a perspective view of the filter cartridge of the invention; and

FIG. 3 is a partially perspective view illustrating a riser tube with the filter cartridge inserted therein and a power head positioned above the riser tube.

DETAILED DESCRIPTION OF THE PREFERRED EMBODIMENT

Figure 1:
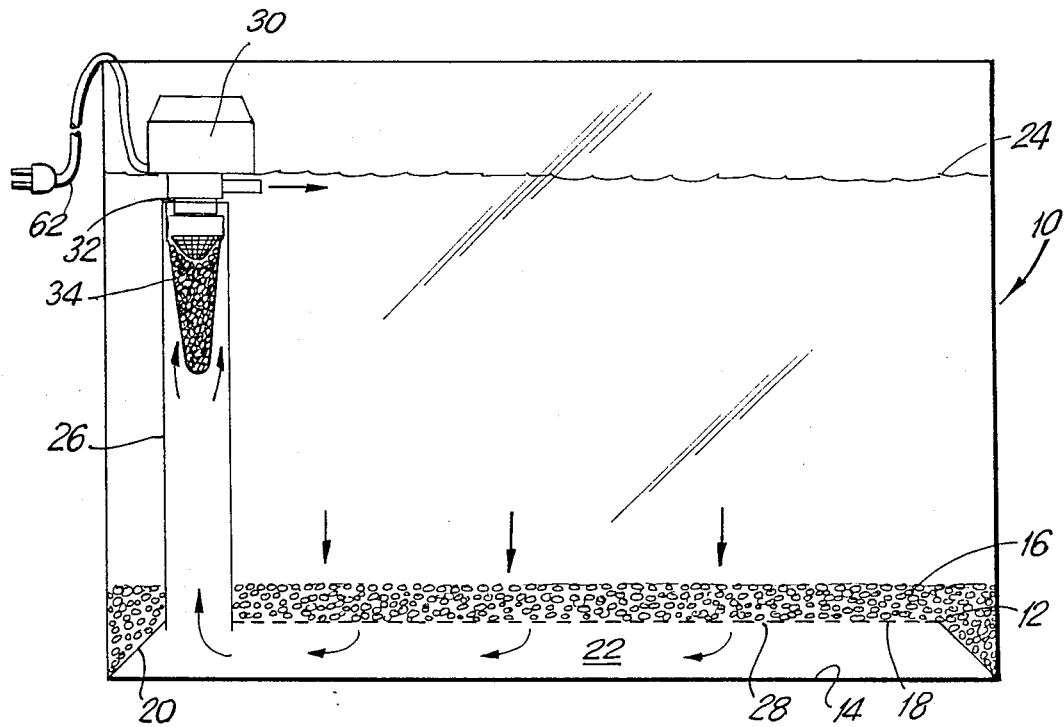
FIG. 1 is a schematic side view showing an aquarium tank with a filter cartridge and power head assembly according to the invention.

Referring now to the drawings in detail there is shown an aquarium tank 10. An undergravel filter designated at 12 is supported at the bottom part of the aquarium tank in a spaced relationship from a bottom wall 14 of aquarium tank 10. A gravel bed 16 is supported on a perforated, substantially flat supporting plate 18 of the filter 12, and a skirt-like side wall structure 20 holds the supporting plate 12 spaced from the bottom wall 14. Wall structure 20 may be integral with plate 18. A chamber 22 is thereby formed between the flat supporting plate 18 and bottom wall 14 of the aquarium tank 10. The tank is filled with water, the upper level of which is denoted by reference numeral 24.

A riser tube 26 fixed at its lower end to the undergravel filter 12 is in communication with and extends upwardly from the chamber 22. Openings 28 in the perforated plate 18 permit water flowing through the gravel particles to pass below plate 18. Openings 28 are, however, sufficiently small to prevent gravel 16 from passing through these openings into chamber 22. The water is drawn from chamber 22 back into the aquarium tank 10 by a power head 30, as will be explained below.

The power head 30 for sucking water from chamber 22 through the riser tube 26 is of any suitable conventional type having a motor-driven water pump and disclosed, for example in U.S. Pat. No. 4,512,724.

As is known, the aquarium sewage drawn between the particles of gravel 16, which forms the aquarium bed, is mechanically filtered as the sewage becomes physically entrapped in the gravel bed 16. Additionally, aerobic bacteria which accumulated on the gravel and on the filter plate provide for biological filtration of the aquarium water. Thereby the aquarium gravel bed 16 serves as a mechanical and biological filtering device which traps particles and in addition, converts some sewage particles into non-toxic substances. However, chemical filtration of the aquarium water is not achieved through the underground filter. Thus chlorine, food dyes, urea and even fish medication remains in the water and is recirculated from the filter right back into the active part of the aquarium.

A filter cartridge 34 for providing such chemical filtration is situated in the upper portion of the riser tube 26 so that it is slightly spaced from the upper end 32 thereof. The filter cartridge 34 can be easily snapped onto an extension 36 of the power head 30 as can be seen from FIG. 3. Power head 30, as also known, is provided with an outlet tube 38 which has a nozzle which directs the water sucked by the pump of power head 30 from chamber 22 into the aquarium tank. Power heads of this type can also be equipped with aeration means to aerate the water returning into the aquarium. Thus the water is aerated after the cartridge whereby it is essentially water alone flowing through the cartridge without air bubbles. It is therefore important that the cartridge does not restrict the flow of water through the riser tube. It is also important that the cartridge is such as to provide adequate water turnover through the chemical filtration material to ensure adequate adsorption of the chemical contaminants in the water.

As best seen in FIGS. 2 and 3 the filter cartridge 34 includes a substantially conical perforated body portion 40 filled with a filtering material 42 which is carbon in the exemplified embodiment. Any other suitable material for conditioning water or any other treatment thereof can be added to the filtering material 42 of the filter cartridge 34. The conical body portion 40 is rounded at its lower end and, at its upper end, merges into a substantially cylindrical portion 44 open at the upper end 32 and adapted for a friction fit on the bottom extension 36 of the power head 30 so that in assembly the power head 30 abuts with its wider flange 50 against the edge 32 of the riser tube 26 and extension 36 sits within the riser tube 26.

As best seen in FIG. 2, a plug 52 of a substantially conical configuration is inserted into the carbon cartridge 34 at the transition zone between the elongated conical body portion 40 and cylindrical upper portion 44. Plug 52 is perforated over its entire surface and is removable from cartridge 34. Similarly to the perforated conical surface of the body portion 40 of the cartridge the conical perforated surface of the plug 52 provides a much greater surface for the flow of water, thus significantly increasing filtering effect of the cartridge. Conical plug 52 is situated in cartridge 34 so that the apex of its cone faces the apex of the cone of conical portion 40 of the cartridge.

Cartridge 34 may be disposable and interchangeable. Alternatively, the same cartridge may be refilled with carbon material and re-used. The conical surface of plug 52 offers more holes and thus enhances its filtering property as compared to a flat bottom end perforated plug. As a result, the cartridge does not provide a restriction to the flow of water through the riser tube. Therefore, the flow of water is not cut down and the action of the power pack in drawing up the water into the riser tube is not defeated by the cartridge. Also, because of the conical shape, there is adequate water flow through the cartridge to maintain good chemical filtration. The cartridge 34 and plug 52 may be made of plastic or any other suitable material.

As seen in FIG. 3, an air supply tube 60, connected to a source of air, is attached to the water outlet tube 38 to aerate water returning into the aquarium tank 10. Tube 38 can be formed as a Venturi tube to direct water and air mixture towards the interior of the tank 10 and enhance its aeration. The introduction of air therefore takes place after the chemical filtration. An electrical cord 62 of the power head 30 is normally plugged into the network to operate the power head which pumps the water sucked from chamber 22 and filtered by the carbon cartridge 34, back into the aquarium 10 whereby all undesired debris are removed from the water before the latter is returned into the aquarium tank. As the water is sucked by the power head, the water passes the carbon material of cartridge 34 and plug 52 and after being chemically filtered, is pumped by power head 30, and passes through outlet tube 38 into tank 10.

There has been disclosed heretofore the best embodiment of the invention presently contemplated. However, it is to be understood that various changes and modifications may be made thereto without departing from the spirit of the invention.

What is claimed is:

1. A combination of an undergravel filter with a power head for filtering water in an aquarium, comprising:
    a perforated plate carrying thereon a gravel bed and forming with a bottom wall of an aquarium chamber;
    a riser tube extending upwardly from said perforated plate and connecting said chamber with said power head, said power head being mounted at the top of said riser tube and constructed so as to suck water from said chamber, said power head including means for returning water sucked from said chamber into an aquarium tank; and
    a filter cartridge connected to said power head and immersed into said riser tube to filter the water before it is returned into said aquarium tank by said power head,
    wherein said cartridge includes a substantially elongated perforated portion of a substantially conical configuration and a cylindrical portion, said conical portion containing a filter material, and
    wherein said cartridge further includes a perforated plug inserted thereinto between said conical portion and said cylindrical portion, said plug being of a substantially conical configuration to provide for an increased filtering surface for the water passing towards the power head.

2. The combination as in claim 1, wherein said cartridge is removably-insertable in said riser tube.

3. The combination as in claim 1, wherein said cartridge is filled with carbon.

4. The combination as in claim 3, wherein said cartridge is re-fillable.

5. The combination as in claim 1, wherein said cartridge includes a perforated housing formed of plastic and filled with a filtering material.

6. The combination as in claim 5, wherein a water treatment material is added to said filtering material in said cartridge.

7. The combination as in claim 1, and comprising said cylindrical portion at an upper end of said conical portion, and wherein said cylindrical portion is adapted for a friction fit on a bottom part of said power head.

8. The combination as in claim 7, wherein said power head is situated on an upper edge of said riser tube.

9. The combination as in claim 1, wherein said plug is situated in said cartridge in an inverted-cone position.

10. The combination as in claim 1, wherein said plug is removably insertable in said cartridge.

11. The combination as in claim 1, wherein said elongated perforated portion has a rounded end.

12. The combination as in claim 1, wherein said returning means includes a water outlet tube provided with an air supply tube to aerate the water returning into the aquarium tank.

13. A combination of an undergravel filter with an electrically driven power head for filtering water in an aquarium, comprising:
    a perforated plate carrying a gravel bed through which aquarium water passes into a chamber formed between said plate and a bottom wall of an aquarium tank;
    a riser tube extending from said plate to said power head, said power head being mounted at the top of said riser tube and being constructed so as to suck water from said chamber and return the water into the aquarium tank; and
    a carbon cartridge having an elongated container body, filled with carbon and having a substantially conical perforated peripheral surface to increase a filtering surface for the water, said body being friction-fit snapped into a bottom of said power head and being immersed in said riser tube to purify water sucked by the power head,
    wherein said cartridge includes an inverted-conical plug removably-inserted in said elongated container body and having a perforated peripheral surface.

14. A combination of an undergravel filter with a power head for filtering water in an aquarium, comprising:
    a perforated plate carrying thereon a gravel bed and forming with a bottom wall of an aquarium a chamber;
    a riser tube extending upwardly from said perforated plate and connecting said chamber with said power head, said power head being mounted at the top of said riser tube and constructed so as to suck water from said chamber, said power head including means for returning water sucked from said chamber into an aquarium tank; and
    a filter cartridge connected to said power head and immersed into said riser tube to filter the water before it is returned into said aquarium tank by said power head,
    said cartridge including a cylindrical portion connected to said power head and a substantially elongated perforated conical portion which contains a filtering material, and a perforated plug of an inverted cone configuration and inserted into the cartridge between said conical portion and said cylindrical portion.

* * * * *